US011151893B1

(12) United States Patent
Rabideau et al.

(10) Patent No.: US 11,151,893 B1
(45) Date of Patent: Oct. 19, 2021

(54) SYSTEM AND METHOD FOR DESIGNING A PERFORMANCE-LEARNING SOLUTION

(75) Inventors: Rick Rabideau, New York, NY (US); Rosemarie Dizon, New York, NY (US); Holly Morgan, New York, NY (US)

(73) Assignee: METROPOLITAN LIFE INSURANCE CO., New York, NY (US)

(*) Notice: Subject to any disclaimer, the term of this patent is extended or adjusted under 35 U.S.C. 154(b) by 1053 days.

(21) Appl. No.: 12/101,920

(22) Filed: Apr. 11, 2008

(51) Int. Cl.
| | |
|---|---|
| G09B 7/04 | (2006.01) |
| G09B 7/02 | (2006.01) |
| G06Q 10/06 | (2012.01) |
| G06Q 10/00 | (2012.01) |
| G06Q 50/20 | (2012.01) |
| G06Q 30/02 | (2012.01) |

(52) U.S. Cl.
CPC ............. G09B 7/02 (2013.01); G09B 7/04 (2013.01); *G06Q 10/00* (2013.01); *G06Q 10/0631* (2013.01); *G06Q 10/06313* (2013.01); *G06Q 30/02* (2013.01); *G06Q 50/20* (2013.01)

(58) Field of Classification Search
CPC ............. G06Q 10/06; G06Q 10/0631; G06Q 10/0637; G09B 7/04; G09B 5/065
USPC ......... 434/118, 219; 705/4, 7.11, 7.13, 7.38, 705/7.42, 326, 328
See application file for complete search history.

(56) References Cited

U.S. PATENT DOCUMENTS

| | | | | |
|---|---|---|---|---|
| 5,616,033 A * | 4/1997 | Kerwin | ................... | G09B 5/065 434/118 |
| 5,772,446 A * | 6/1998 | Rosen | ...................... | G09B 5/02 434/307 R |
| 6,409,514 B1 * | 6/2002 | Bull | ......................... | G09B 5/02 434/118 |
| 6,411,936 B1 * | 6/2002 | Sanders | ................. | G06Q 10/06 705/7.32 |
| 6,978,115 B2 * | 12/2005 | Whitehurst | .............. | G09B 7/04 118/118 |
| 7,191,139 B2 * | 3/2007 | Roy | .................... | G06Q 10/1053 705/321 |
| 7,860,736 B2 * | 12/2010 | Draper | ................. | G06Q 10/063 434/118 |
| 2003/0046125 A1 * | 3/2003 | Flores | .................... | G06Q 10/06 705/7.23 |
| 2004/0002040 A1 * | 1/2004 | Foley | ..................... | G06Q 10/06 434/118 |
| 2004/0002888 A1 * | 1/2004 | Draper, Jr. | ........ | G06Q 10/06311 705/7.13 |

(Continued)

OTHER PUBLICATIONS

Lean Six Sigma Toolbook Hill companies[online],[retrieved on May 16, 2015]. Retrieved from the Internet: URL<https://books.google.com/books?id=NEB-ZzrkQhcC&pg=PA1&source=gbs_toc_r&cad=4>.*

*Primary Examiner* — Jerry-Daryl Fletcher
*Assistant Examiner* — Sadaruz Zaman
(74) *Attorney, Agent, or Firm* — Adam P. Daniels, Esq.; Polsinelli PC

(57) ABSTRACT

The present invention relates to designing a performance-learning solution and related methods for managing the learning and training needs of an organization in a manner that is responsive to dynamic business needs. In particular, the present invention relates to solutions that are performance-based and provide a learning environment that is targeted towards the improvement of worker productivity and the accomplishment of specific goals.

4 Claims, 10 Drawing Sheets

(56) References Cited

U.S. PATENT DOCUMENTS

| | | | |
|---|---|---|---|
| 2004/0063085 A1* | 4/2004 | Ivanir | G09B 7/08 434/322 |
| 2004/0133437 A1* | 7/2004 | Draper et al. | 705/1 |
| 2007/0281285 A1* | 12/2007 | Jayaweera | G09B 7/02 434/156 |
| 2008/0021769 A1* | 1/2008 | Higgins | G06Q 10/0631 705/7.24 |
| 2008/0177504 A1* | 7/2008 | Niblock | G09B 19/00 702/182 |
| 2009/0228499 A1* | 9/2009 | Schmidtler | G06N 99/005 |
| 2010/0190145 A1* | 7/2010 | Singer | G09B 7/04 434/335 |

\* cited by examiner

| Name of Phase | Process Name |
|---|---|
| 1. Analysis | Analysis Flow —110 |
| 2. Design | Design Flow —120 |
| 3. Development | Development Flow —130 |
| 4. Implementation | Implementation Flow —140 |
| 5. Evaluation | Evaluation Flow —150 |

*Fig.1*

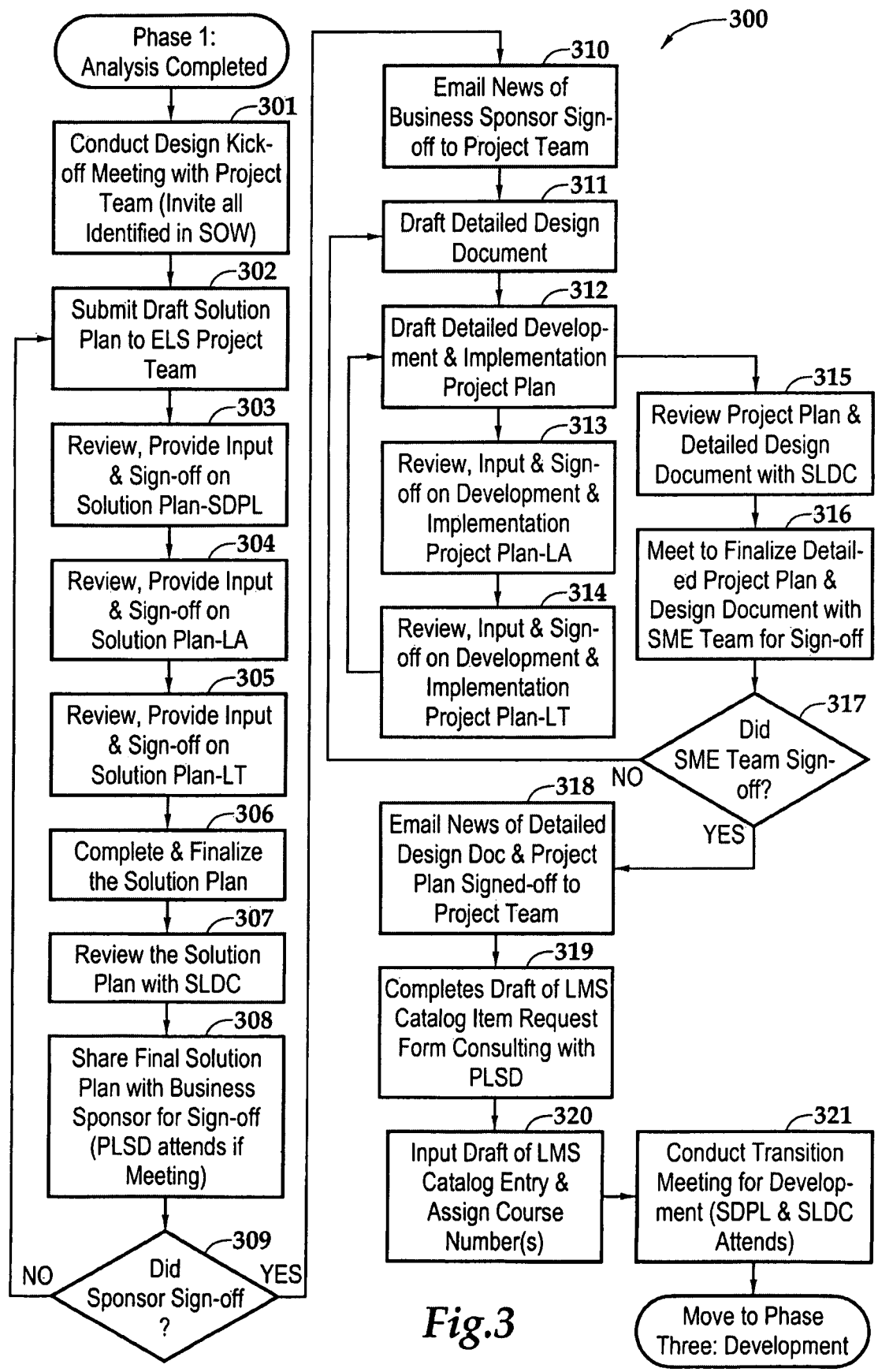

SYSTEM AND METHOD FOR DESIGNING A PERFORMANCE-LEARNING SOLUTION

BACKGROUND

Field of the Invention

The present invention relates to designing a performance-learning solution and related methods for managing the learning and training needs of an organization in a manner that is responsive to dynamic business needs. In particular, the present invention relates to solutions that are performance-based and provide a learning environment that is targeted towards the improvement of worker productivity and the accomplishment of specific goals.

Background of the Invention

Employee training and education are becoming increasingly more critical to the success of organizations within today's modern global economy. Performance support capabilities are needed to ensure that ongoing learning efforts are aligned with the business strategies and budget priorities as measured by quantifiable performance metrics. Such performance support capabilities must effectively collect and present to leaders and workers information upon which to make decisions and maximize productivity.

Contemporary learning techniques are typically either training-based, where the process is information-centric and involves a push-type system that results in passive learning, or learning-based, where the process is learner-centric and involves a pull-type system that results in active learning. Furthermore, contemporary learning solutions fall short of providing the ability to monitor performance of performance-learning solution efforts in achieving their underlying purpose of achieving business strategies. The inability to accurately monitor performance metrics inhibits organizations and their learning services from ensuring worker productivity and service quality, allowing for accurate resource forecasts, allocating costs and providing a means to measure the learning solution's success. Thus, there remains a need for improvements in the design of institutional learning solutions and supporting processes. Such a design is calculated to leverage performance consulting in order to identify the true need and performance expectations of the organization.

SUMMARY OF THE INVENTION

In light of the above-described and other deficiencies inherent in contemporary learning solutions, the various embodiments of the present invention provide learning solutions and related methods that are designed to ensure that an organization's instructional content and delivery mechanisms are aligned with the business goals and performance objectives of the aligned job function. Ensuring the resultant learning solutions are capable of dramatically improving an organization's performance by identifying, prioritizing, developing and delivering employee learning opportunities and by providing dynamic system monitoring capabilities that ensure the effectiveness of the critical employee learning efforts. Various aspects of the invention provide, among other things, alignment with business strategies and goals through analysis of the performance objectives and goals and leveraging existing data collection systems in order to design dynamic performance-based learning solutions.

In this regard, an aspect of the invention includes a method for aligning employee learning opportunities with strategic business goals and priorities of an employer organization by designing highly efficient and effective performance-learning solutions. The method comprises gathering a set of business goals from the employer organization, and identifying performance data collected by the employer organization. The method further includes transforming the business goals of the employer organization into performance objectives relative to the data, and designating performance-learning solutions for the employer organization. These performance-learning solutions support the organization's performance objectives. Additionally, the method includes receiving requests from the employer organization for learning efforts to train the employees and prioritizing the requests and selecting appropriate performance-learning solution approaches for each received request. The appropriate performance-learning solutions are subject to a budget allocation based upon business priority, the audience size and geography, permanence of the material, level of skill development required and other considerations. Also, the method includes monitoring the performance data subsequent to delivery of the learning effort and computing changes in the performance data caused by delivery of the learning effort, and reporting measurement of the performance metrics based on the computed changes in the performance data.

BRIEF DESCRIPTION OF THE DRAWINGS

The accompanying drawings are included to provide further understanding of the invention and are incorporated in and constitute a part of this specification. The accompanying drawings illustrate embodiments of the invention and together with the description serve to explain the principles of the invention. In the figures:

FIG. 1 is a schematic diagram depicting the interaction of the basic modules of a process for designing a performance-learning solution according to embodiments of the present invention;

FIG. 3 is a flow diagram depicting the design step according to embodiments of the present invention;

DETAILED DESCRIPTION OF EXEMPLARY EMBODIMENTS OF THE INVENTION

Figure 2A:
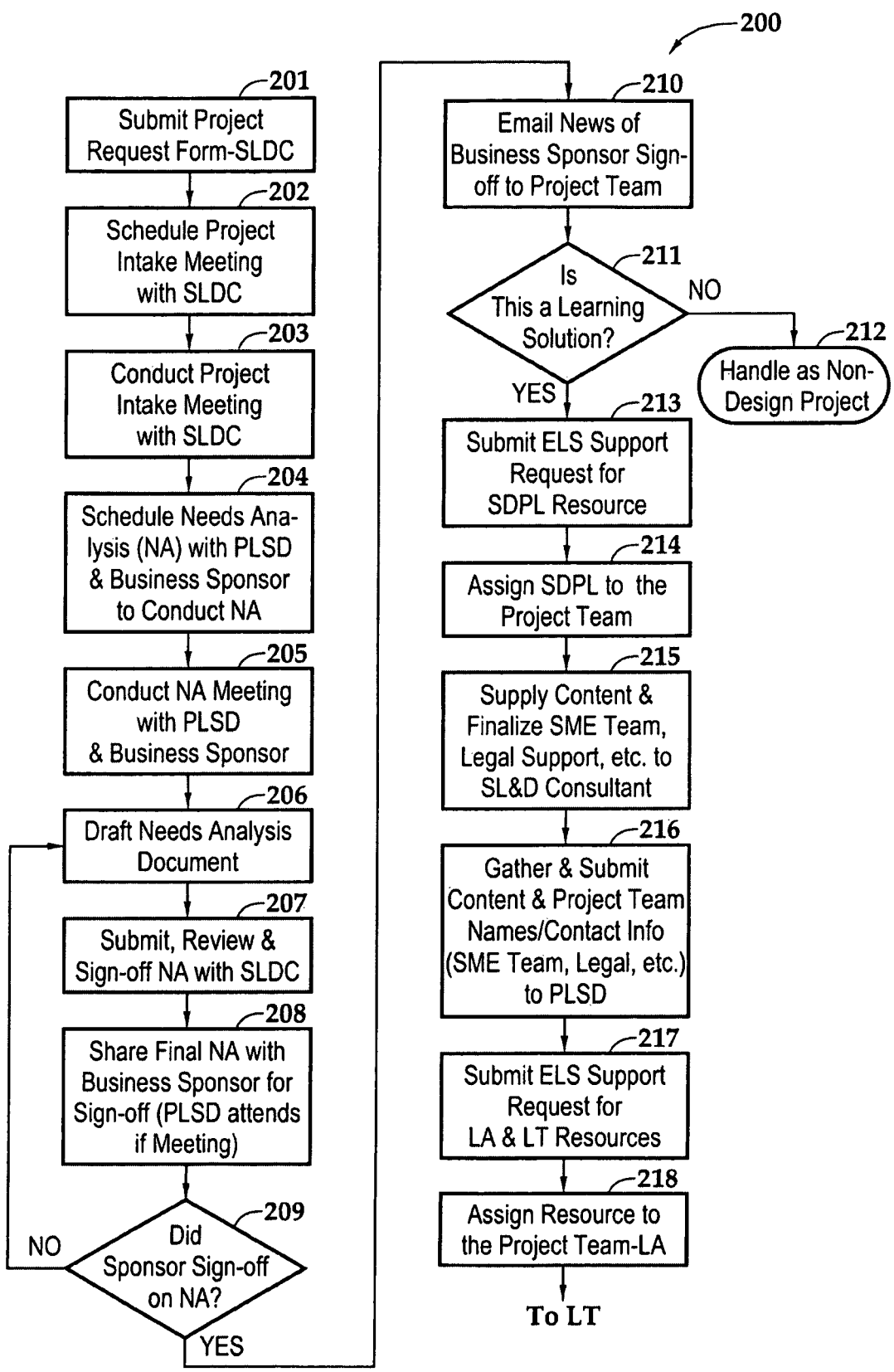
FIGS. 2A and 2B show a flow diagram depicting the analysis step according to embodiments of the present invention.

As used hereafter, the term "organization" is used broadly to identify the business entity that is in need of a solution to provide learning services. The performance-learning solutions according to the present invention can either be can be implemented internally within the organization (as, for example, an independent business unit within the organization) or can be outsourced by such organizations (whereby the processes of the performance-learning solution are implemented by a third-party learning services provider under contract to an organization).

Embodiments of the invention are directed to the design of a performance-learning solution that allows for maximum retention and application of the subject matter by the user of the solution, and consequently provides a design for faster and better learning. Such a design is calculated to leverage performance consulting in order to identify the true need and performance expectations of the organization. Additionally, the performance-learning solution design according to embodiments of the invention adhere to adult learning principles and create an environment to practice and reinforce learning.

Embodiments of the invention are also directed to designing efficient learning experiences that bring the learning process close to the work-place by using on-the-job, case-based and problem-solving instructional approaches. Embodiments of the invention also use instructional components that are modular, flexible and customizable depending on the type and level of instruction desired, and incorporate eLearning principles to provide more learning in less time.

Embodiments of the invention are further directed to designing instructional solutions that support the transfer of knowledge and skill which include, post-training interventions that reinforce the learning.

FIG. 1 depicts a schematic representation of the basic steps that form the basis of a performance-learning solution of the invention. Solution 100 includes phases or modules of interrelated and interdependent business processes that manage and coordinate the performance-learning solution tasks of the prioritization of business learning needs and prescription of learning effort approaches, the development of learning content, the delivery of learning content and instruction, and the administration of performance-learning solution performance. The interaction of the various modules of business processes with one another helps to define the services, performance metrics and application capabilities, among other things, required to support an optimized performance-learning solution to meet a given organization's business learning objectives.

As depicted in FIG. 1, the analysis phase (analysis module) comprises an analysis flow 110 that includes steps relating to the submission of a project request form, scheduling a project intake meeting, conducting a "needs analysis" meeting, submitting a learning support request, and drafting a statement of work.

After solution 100 analyses have determined the desired performance-learning needs required by the organization and prioritizes them in order to meet business goals, the solution is also able to prescribe suitable learning assets to fill those needs. The design phase (design module) comprises a design flow 120 that includes processes and associated tools required to build and/or buy appropriate learning content based upon learning objectives and delivery requirements. On one hand, it may be easier and cheaper to buy precompiled learning content from a third-party as opposed to developing or compiling new content. Alternatively, the specialized needs of the organization may make it difficult to utilize outsourced or precompiled learning or training content. The design flow 120 includes steps relating to drafting a solution plan, drafting a design document, and selecting a matrix for delivery of content.

After the design flow 120 has completed the process of creating a performance-learning solution plan, the development flow 130, which is part of the development phase (development module), carries out processes relating to creation of the components of the solution. The processes in the development flow 130 include creation of a storyboard template, developing instructor guides and creating participant content which may include learner guides, simulations, job aids, role plays, case studies, assessments and eLearning (electronic learning) modules. After learning content has either been obtained from a third-party or developed internally by the performance-learning solution of the invention, the processes of the development flow 130 also create, manage and operate a central repository of learning assets and knowledge objects. The learning assets and knowledge objects are appropriately formatted, tagged and cataloged such that they can be reused as appropriate and may be easily accessed for delivery to the learner in the desired manner when scheduled or requested.

The implementation flow 140, which is part of the implementation phase (implementation module), in turn contains business processes and related tools for providing the delivery of high quality training in a cost efficient manner. The implementation processes in the implementation flow 140 facilitate, for example, instructor-led training, virtual instructor-led training (such as with a live instructor connected to learners through videoconferencing or over a computer network like the Internet), and eLearning (interactive computer software-delivered training) systems for self-paced learning. Further, the processes in the implementation flow 140 manage coordinating the scheduling of the facilities where training takes place with appropriate instructor and learner commitments, and include partnering with the business to ensure "business readiness" in order to seamlessly integrate the performance-learning solution into the work environment.

The evaluation flow 150, which is part of the evaluation phase (evaluation module), contains business processes and associated tools necessary to provide an interface between the organization's data sources and the performance-learning solution 100. The evaluation flow 150 assesses the organization's underlying data collection infrastructure and determines an appropriate mechanism for receiving data required to assess achievement of the learning objectives and effectiveness of the performance-learning solution. This mechanism may be push or pull, and may use real-time or periodic updates, depending on the requirements of the organization, security concerns, network infrastructure, as well as other issues. Underlying data formats used by the organization may affect the actual data fields processed during the evaluation flow 150. The evaluation flow 150 may optionally communicate with the analysis flow 110 in order to revise learning objectives as necessary to accommodate the actual data fields received. The evaluation flow 150 also includes reporting capability in order to report on the data collected from the organization.

The processes of the analysis flow 110 are central in ensuring that the learning efforts produced by the performance-learning solution components are completely aligned with the strategic goals of the organization as expressed by the performance objectives. The analysis flow 110 passes the requests from the organization (or business units thereof) for new learning efforts or for modified learning efforts through a formal process whereby the requested learning effort becomes cast in a consistent direction with organizational strategic goals and priorities, funded from appropriate budget allocations, and transformed into a work in progress by the performance-learning solution 100.

The analysis flow 110 is important for assessing the learning needs of a target audience when designing a performance-learning solution for that audience. The analysis process determines what the audience already knows, what they need to know and the best way of transferring the required knowledge to the audience or developing the desired skills. The analysis process is important because it first seeks to determine if the inhibitor to the desired performance is indeed caused by a knowledge or skill deficiency. The target audience does not need a performance-learning solution if the performance inhibitor is related to inadequate systems or processes. Thus, in addition to customizing the performance-learning solution to suit the target audience's needs, the analysis process ensures the appropriate solution is determined and, if a performance-learning solution is required, it assists in the influence of the design of the performance-learning solution as well as the development and delivery of the instruction.

A non-exhaustive list of factors to consider when performing the analysis process on the target audience is their experience level in the present or related jobs, employment level, the number of members in the target audience, their location, education, reading level and cultural background, as well as language or cultural differences, motivation, physical and mental characteristics and specific interests and biases.

The tools that could be employed to conduct the analysis process include interviews with both the instructors as well as members of the target audience, questionnaires, pretests and research literature.

Figure 2B:
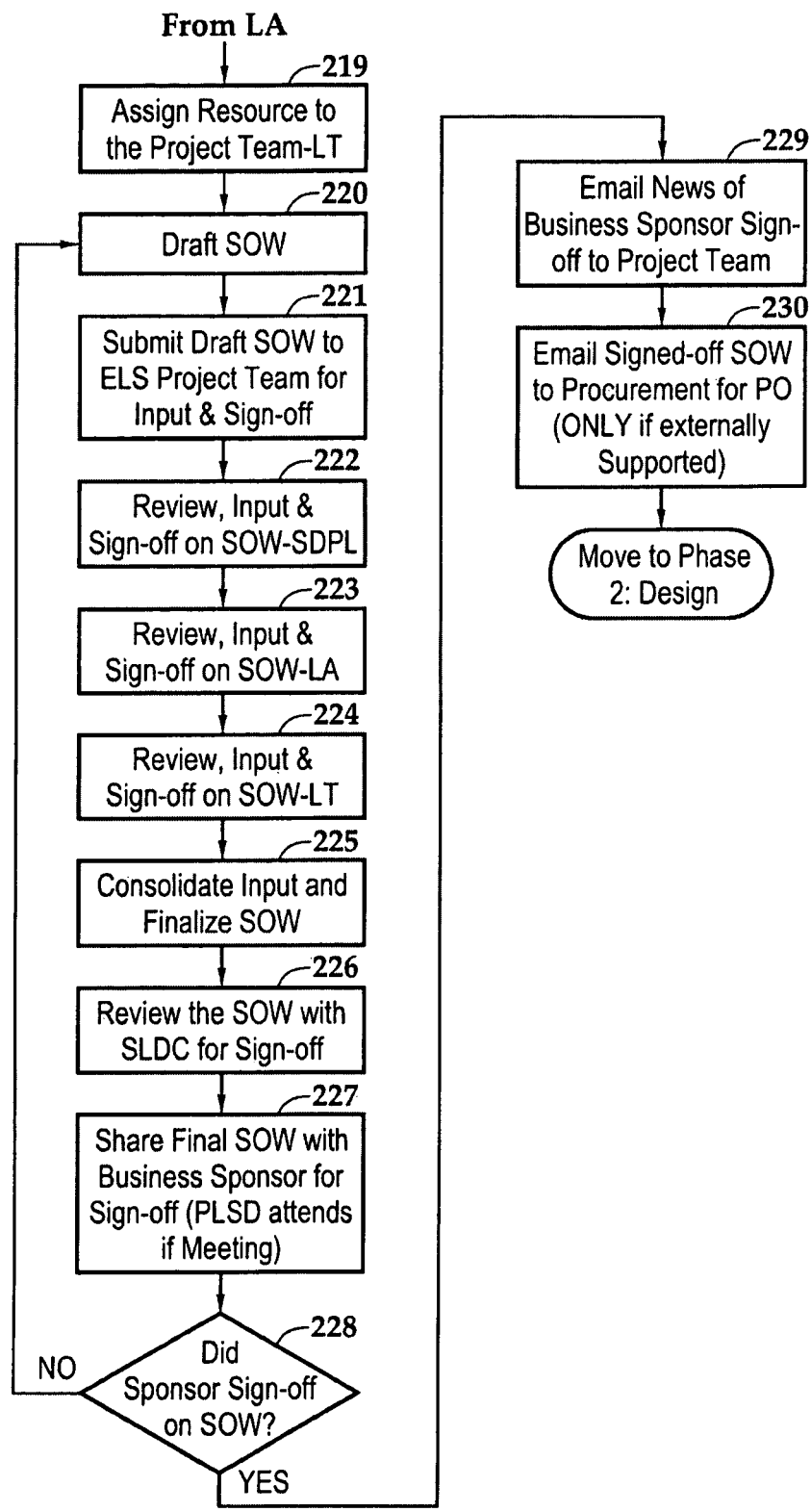

Referring now to FIGS. 2A and 2B, an analysis phase 200 utilized in certain embodiments of the present invention is depicted and includes various steps that enable newly requested and ongoing learning efforts to be aligned with prioritized business strategies and goals.

As depicted in FIGS. 2A and 2B, the analysis phase 200 prepares a customized learning blueprint document or statement of work (SOW) for the organization. A learning SOW provides a grouping and organization of various business strategies and goals across the entire organization and identifies potential areas of learning. Organizations will likely have multiple learning SOWs in process simultaneously. The learning SOWs are therefore unique and are used by the analysis process 200 to determine which potential learning efforts (from the many requested by various entities within the organization) or modifications are funded (including from which budget allocation and to what amount) and pursued (i.e., if the requested learning effort consistent with one or more stated learning objectives reflected in the SOW) and exactly how the request is fulfilled (i.e., requested learning efforts that map to higher organizational priorities may be entitled to different funding or resources). An organization's learning solutions are continuously reviewed and revised by the analysis module 110 for the organization to reflect changing business strategies and learning services budgets or insights gained from business measurement studies. Additionally, an organization's learning SOWs may be reviewed and revised at any time whenever significant changes in the learning focus and business strategies or priorities of the learner organization occurs.

Referring again to FIG. 2A, the analysis phase 200 initially receives a request (201) for learning services (a "project request") from an individual or business unit of the organization. The project request details what the individual or business unit submitting the request believes is an important learning need that requires a new or modified learning effort, and is submitted to a senior learning and development consultant (SLDC). According to embodiments of the invention, a project request can be made in any form, including a verbal communication, a voicemail message, a letter, or an email message directed to the senior learning and development consultant (SLDC) aligned to that business unit. Preferably, the request is provided on the standardized Project Request form (which, even more preferably, can be electronically submitted) that is completed by the senior learning and development consultant (SLDC), and where the form contains queries designed to elicit sufficiently detailed information that allows the analysis phase contact to understand the request sufficiently. After receiving a project request (202), a project intake meeting is scheduled between senior learning and development consultant (SLDC) and a performance-learning solutions designer (PLSD) to discuss the business need and primary objectives. A project intake meeting is conducted (203), following which a "Needs Analysis" (NA) meeting is scheduled (204). A needs analysis meeting is conducted by the SLDC with a PLSD and a business sponsor (205). The needs analysis meeting discusses the setting of expectations with respect to the specific project, identifies project stakeholders and key participants, identifies the target audience, and analyses the requirements of the project based on current performance and desired performance of the participants. Following the needs analysis meeting, a needs analysis document is drafted (206).

After obtaining the required reviews and sign-offs (207-210), a determination is made regarding whether the request is addressable through a performance-learning solution or whether it would alternatively be best addressed through other measures like documentation or communications produced by the resources of the requesting business unit of the organization. In the event that the project request is not deemed suitable for a performance-learning solution, a rejection is sent to the requester (211), and the request is handled as a non-design project (212).

Whenever a project request is deemed to present a learning need that is addressable by the learning solution, steps 213-219 are performed. In these steps, a support request is submitted for senior development projects lead (SDPL) resources (213) and the senior development projects lead (SDPL) is assigned to a project team (214). The content of the project is supplied and the subject matter expert (SME) team is finalized (215). The details of the project team are submitted to Learning Support Services with a request for resources from learning administration (LA) and learning technology (LT) (216 and 217). Resources from learning administration (LA) and learning technology (LT) are assigned to the project team in steps 218 and 219. The project team drafts a statement of work (SOW) (220), which is submitted to the project team for input and sign-off (221). The draft SOW is subsequently also reviewed by the senior development projects lead (SDPL) (222), learning administration (LA) (223) and learning technology (LT) (224). The input received from all of the reviews is consolidated and the SOW is finalized (225). The SOW is reviewed with the senior learning and development consultant (SLDC) for sign off (226). The final SOW is also shared with the business sponsor for sign-off (227). If for any reason the business sponsor does not sign off on the SOW (229), the business sponsor's concerns are considered and the SOW is transferred to the draft step (220) and a new draft of the SOW is created. After obtaining the business sponsor's approval (228), the SOW is communicated to the project team (229). Additionally, if the SOW is to be carried external to the learner organization, it is also e-mailed to the procurement team to obtain a purchase order (230).

It should be understood that in performing some of the processes of the analysis module 110, it is often necessary for person to person interaction to occur between the various roles within the learner organization. For example, in preparing and revising a learning SOW and in establishing budget allocations for learning initiatives it is necessary for the analysis flow 110 to interface with the business organization in order to identify and prioritize business strategies. In certain embodiments of the invention, such an interface can be provided by the senior learning and development consultant (SLDC) and other representatives from the learner organization. Optimally, the representatives are taken from all involved segments of the organization, such as various product segments, business groups, administrative groups (e.g., human resources and information technology), and regional/international divisions and channels, to provide a comprehensive interface with the ever-changing goals of the organization.

The performance-learning solution 100 according to some embodiments of the present invention can facilitate the dissemination of critical learning information by internally developing deliverable learning content that is consistent with the business needs of a specific organization. By aligning the development of the information with an organization's performance objectives according to its own performance data, the performance-learning solution 100 presents the critical information to the learners in a logical, intuitive and valuable manner that is designed to enhance learner receptivity, knowledge retention and skill development.

FIGS. 3A and 3B illustrate a design phase 300 for creating a design document for the SOW developed in the analysis phase 200. An initial meeting is conducted of all members identified in the SOW and the project team (301), and a draft solution plan is submitted to the eLearning solution (ELS) project team (302). The draft solution plan is reviewed by the senior development projects leader (SDPL) (303), learning administration (LA) (304) and learning technology (LT) (305). Based on the review and input received in steps 303-305, the solution plan is completed and finalized (306). The completed solution plan is reviewed with senior learning and development consultant (SLDC) (307) and shared with the business sponsor for final sign off (308). If the business sponsor does not sign-off on the completed solution plan (309), the plan is transferred to the draft stage (302) and a new solution plan is drafted. After obtaining the business sponsor's approval, the completed solution plan is forwarded to the project team (310).

A detailed design document is drafted (311) along with a detailed development and implementation project plan (312). The detailed development and implementation project plan is reviewed by learning administration (LA) (313) and learning technology (LT) (314). The detailed design document and project plan are reviewed with senior learning and development consultant (SLDC) (315). The senior learning and development consultant (SLDC) meets with the subject matter expert (SME) team to finalize the detailed design document and project plan (316). The subject matter expert (SME) team is then tasked with signing off on the finalized design document and project plan (317). If the subject matter expert (SME) team does not sign-off on the plans, they are transferred to the draft stage for rework (311). If the subject matter expert (SME) team signs-off on the plans, the detailed design document and project plan are forwarded to the project team by the senior learning and development consultant (SLDC) (318). If the subject matter expert (SME) does not sign off on the plans, the plans are sent back to the drafting stage 311.

After the detailed design document and project plan have been forwarded to the project team, the senior learning and development consultant (SLDC) consults with the performance-learning solution designer (PLSD) to draft a catalog item request form for the performance-learning solution (319). Learning technology (LT) assigns a course number to the performance-learning solution (320). Following this, the performance-learning solution designer (PLSD) conducts a transition meeting in preparation for moving into the development phase (321).

The present invention provides a modular, training method wherein a performance-learning solution is designed and created such that it is comprised of modules, each of which further comprises one or more cognitive constructs (also known as learning objects). The performance-learning solution is designed along with assessments and instructional materials such that the order in which the modules are presented is freely modifiable at the option of an administrator or a user. A modular training method of the invention comprises the steps of: dividing a body of knowledge into a plurality of cognitive constructs, providing a plurality of instructional components (instructional materials), each of the instructional components corresponding to or relating to (i.e., containing information relevant to) at least one cognitive construct, providing a plurality of learning modules, each of the learning modules comprising at least one cognitive construct, providing a performance-learning solution, wherein the performance-learning solution comprises one or more learning modules, providing a post-instruction assessment, wherein the post-instruction assessment corresponds to the performance-learning solution. In an embodiment of the invention, the learning modules are provided to a learning professional seeking to provide a learning solution, the learning professional ordering the required number of learning modules for the specific learning solution, and presenting the instructional components associated with each learning module to a learner. In certain embodiments of the invention, a user (i.e., learner) may order the required number of learning modules for a specific performance-learning solution without the assistance or intervention of a learning professional. After the learning modules associated with a specific learning solution have been provided to a learner, the post-instruction assessment of the instructional material associated with each performance-learning solution is provided to the learner, comparing a result of the post-instruction assessment of the instructional material associated with a learning solution to a standard for that performance-learning solution. If the result of the post-instruction assessment of the instructional material associated with the current learning solution is lower than the standard for the current performance-learning solution, the learner is re-presented with the instructional material associated with one or more modules of the learning solution, and the process is repeated for as many modules of the performance-learning solution as required to achieve the goals of the learning solution.

In certain embodiments of the invention, the sequence in which the learning modules are presented to a learner is aligned with standards relating to expected student competency with respect to the body of knowledge.

Prior to the administration of the performance-learning solution to a learner, it may be worthwhile to provide a pre-instruction assessment that corresponds to the performance solution to a learner, where the pre-instruction assessment of the learner aids in determining the level of knowledge that pre-exists in the learner. After the pre-instruction assessment is presented to a learner, the result of the pre-instruction assessment is compared to the established standard for the performance-learning solution. If the result of the pre-instruction assessment is at least substantially equal to the standard for the performance-learning solution, the instructional material and the post-instruction assessment associated with the performance-learning solution are skipped. Thus, the pre-instruction assessment process assists a learning professional to determine whether a particular performance-learning solution would teach the learner any new information or be repetitious of knowledge that the learner already possesses.

If the result of the post-instruction assessment of the instructional material associated with the performance-learning solution is not at least substantially equal to the standard for the performance-learning solution, the instructional material associated with the performance-learning is re-presented to the learner, and the post-instruction assessment associated with the performance-learning solution is re-administered. The difference between a result of the post-instruction assessment associated with the performance-learning solution taken after the instructional material associated with the performance-learning solution is re-presented and a result of the post-instruction assessment associated with the performance-learning solution taken before the instructional material associated with the performance-learning solution is re-presented is computed. If the computed difference is negative or substantially equal to zero, the learning professional intervenes in the presentation of the instructional material in order to make any changes that would be necessary to improve the learner's ability to gasp the knowledge contained within the instructional material corresponding to a performance-learning solution.

The present invention further provides a learning content management system (LCMS) that manages all of the cognitive constructs of a body of knowledge. In an embodiment of the invention, an administrator controls a presentation device, a body of knowledge is stored in the presentation device and divided into a plurality of cognitive constructs, a plurality of instructional materials are associated with the cognitive constructs, which are in turn assemble into learning modules. The learning modules are presented to a learner in the order of a sequence that is based on a specific performance-learning solution.

The present invention further provides a computer-implemented method of modular instruction in which a body of knowledge is divided into a plurality of cognitive constructs, a plurality of instructional materials is provided that correspond to the cognitive constructs, a plurality of learning modules is provided that comprise one or more cognitive constructs, and a performance-learning solution is provided that comprises one or more learning modules. The learning modules are stored in the memory of a computer and provided to a learning professional who is capable of ordering the sequence in which the learning modules are presented to learners via an output device, the instructional material associated with a learning module is presented via an output device to a learner in accordance with the order of the sequence. In certain embodiments of the invention, a user may order the required sequence of learning modules for a specific learning solution without the assistance or intervention of a learning professional. At the conclusion of the sequence of learning modules i.e., a performance-learning solution, the post-instruction assessment of the instructional material associated with a learning solution is presented via an output device to the learner, a result of the post-instruction assessment completed by the learner is received, stored in memory; and compared to a standard for the learning solution. If the result of the post-instruction assessment of the instructional material associated with the current learning solution is lower than the standard for the current learning solution, the learner is re-presented with the instructional material associated with one or more modules of the learning solution, and the process is repeated for as many modules of the learning solution as required to achieve the goals of the learning solution.

The present invention further provides a method of modular instruction of a body of knowledge divided into plural cognitive constructs using at least one instructional material corresponding to one of the cognitive constructs, using at least one learning module comprising the cognitive construct, using at least one performance-learning solution comprising the learning module, and at least one post-instruction assessment corresponding to the performance-learning solution.

The present invention further provides a method of modular instruction comprising the steps of a) dividing a body of knowledge into a plurality of cognitive constructs, b) providing a plurality of instructional materials in electronic format, each of said instructional components corresponding to at least one cognitive construct, c) providing a plurality of learning modules, each of said learning modules comprising one or more cognitive constructs, d) providing a performance-learning solution, each said performance-learning solution comprising one or more learning modules, e) providing a post-instruction assessment in electronic format, said post-instruction assessment corresponding to the performance-learning solution, f) receiving an order for learning modules for a given body of knowledge in a sequence, said sequence being based on the specific learning solution and g) transmitting the learning modules in an electronic format in response to the order received in step f). In a preferred embodiment, step g) includes transmitting the learning modules over the Internet. The method may also include the step of h) displaying the learning modules corresponding to a body of knowledge in a sequence on a website accessible via the Internet.

In operation, upon receiving the initial content design requirements from the analysis phase 200, the design phase 300 leverages technology and organization services to implement a series of functions, tests, and analyses to produce an initial layout of any new content that needs to be developed for a given learning solution. The functions, tests, and analyses performed during the design phase 300 include performance strategy and role impact strategy to make an initial assessment regarding a recommended instructional design (i.e., whether to utilize computer delivered self-paced learning solutions, instructor-led training, virtual classrooms, etc.). In making this initial assessment, care is taken to perform audience analyses and environment analyses to ensure that the chosen instruction design is consistent with the design specifications, compatible with the logistics of the learning audience (e.g., whether it is feasible to expect the learners to be able to attend pre-scheduled live classes with an instructor) or with learning services resources (such as instructor/classroom availability, budget and development schedule constraints). The initial assessment will often also include media layout design (i.e., for a computer-delivered interactive learning solution, this would include a layout of the types of audio, video, and graphical presentations and simulations that would be required or useful in teaching the subject matter) and indications as to whether SMEs would be necessary for consultation.

In the event that additional information is necessary or that the performance-learning solution cannot be developed within budget or logistical constraints, feedback can be provided upstream to the analysis processes to obtain revised initial content design requirements. All of the information included in the initial design assessment is used to produce a development plan that is sensitive to budget and logistical constraints and delivery timelines, with the solution plan then being referenced by the later steps of content development phase 400.

During the development phase 400, development resource services are leveraged to develop suitable learning content for the carefully designed learning solution. This process can include, for example, subject matter information collection and organization via SMEs, eLearning content development for self-paced learning solutions, instructor-led materials, virtual classroom design and scheduling development, for use in one or more learning solutions of various types, packaging and integration with pre-existing learning content, negotiation of any licenses or rights to use purchased content, instructor development and training, and job-aid production.

Figure 4A:
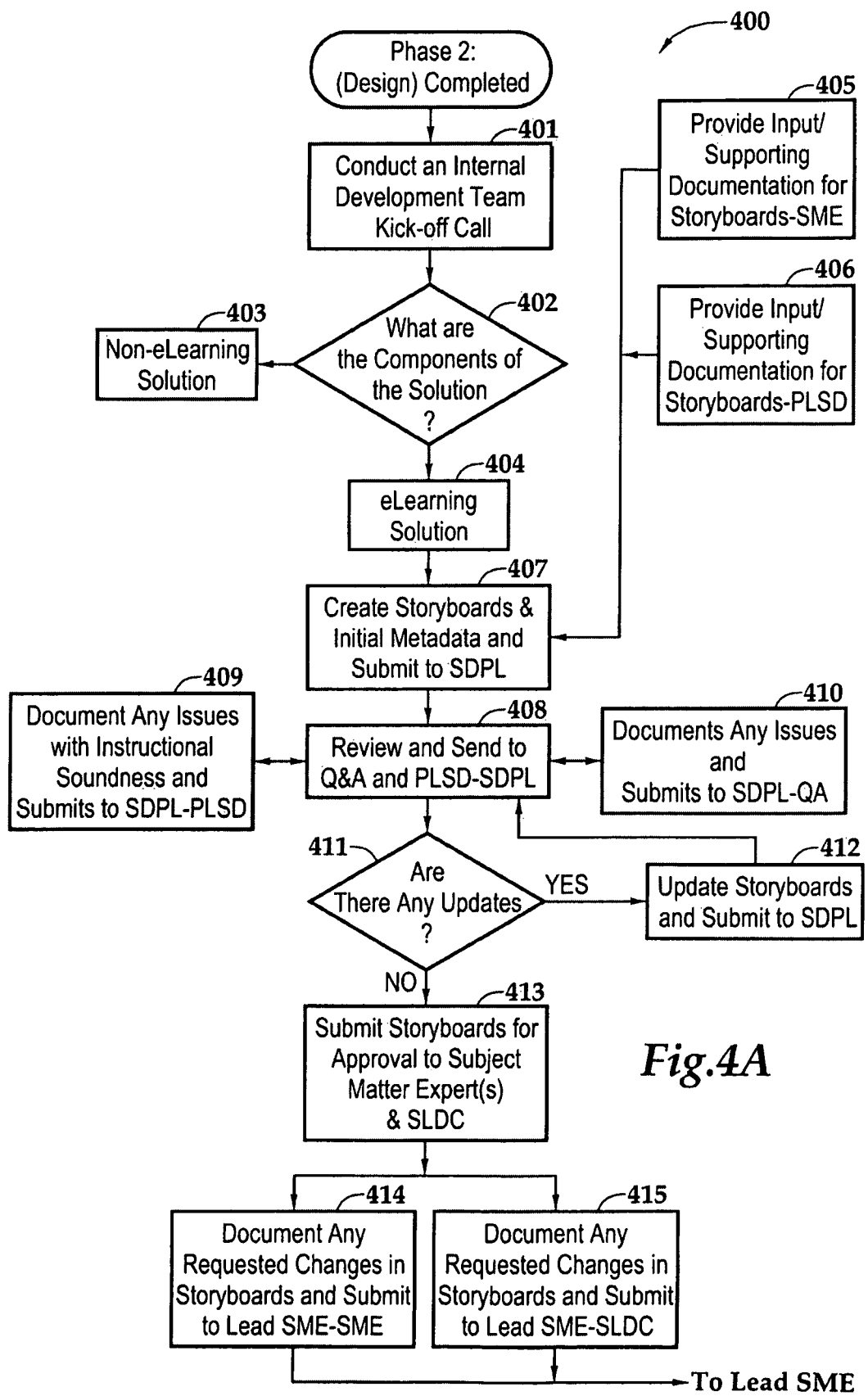
FIGS. 4A, 4B and 4C show a flow diagram depicting the development step according to embodiments of the present invention.
Figure 4B:
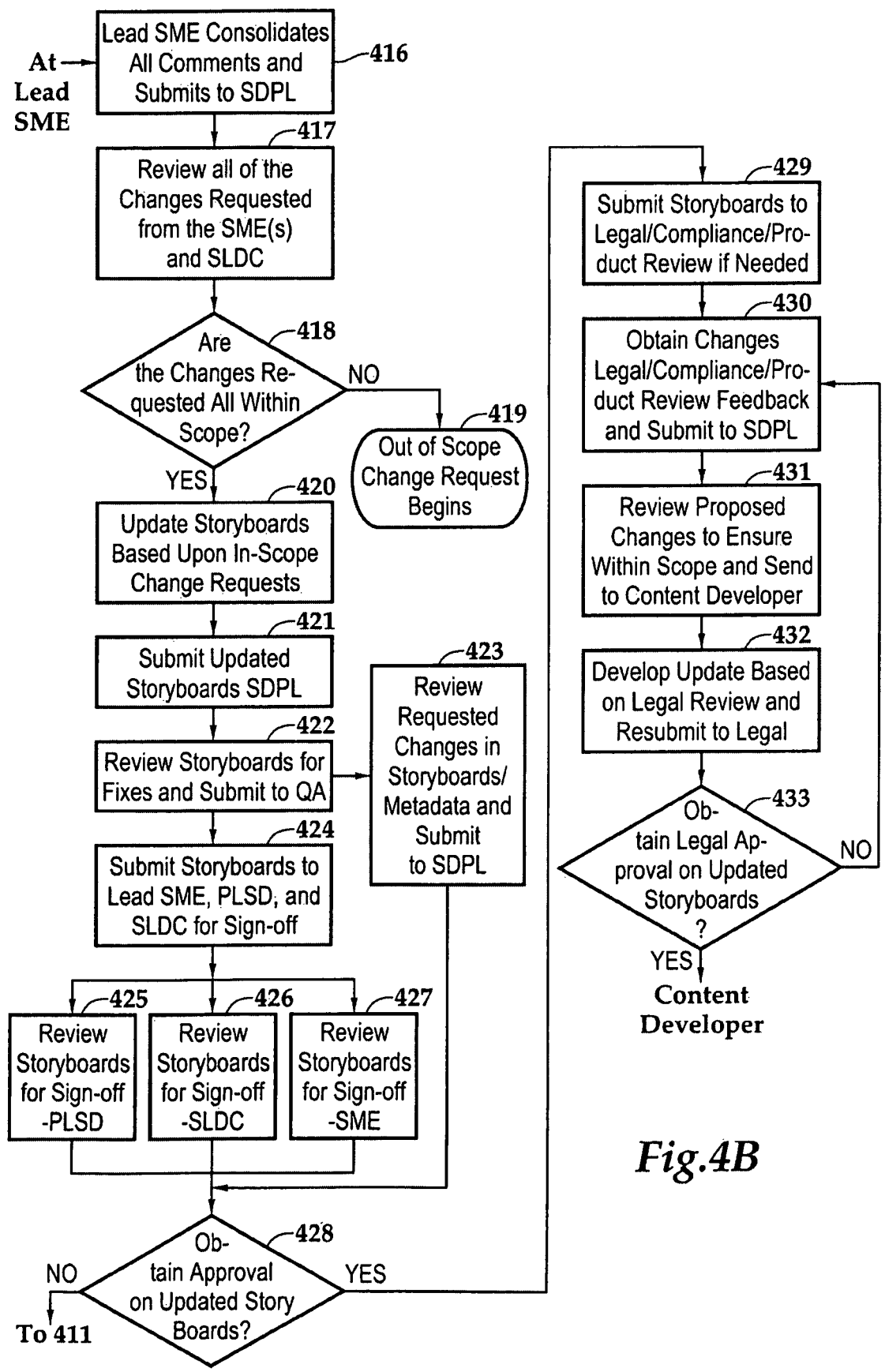
Figure 4C:
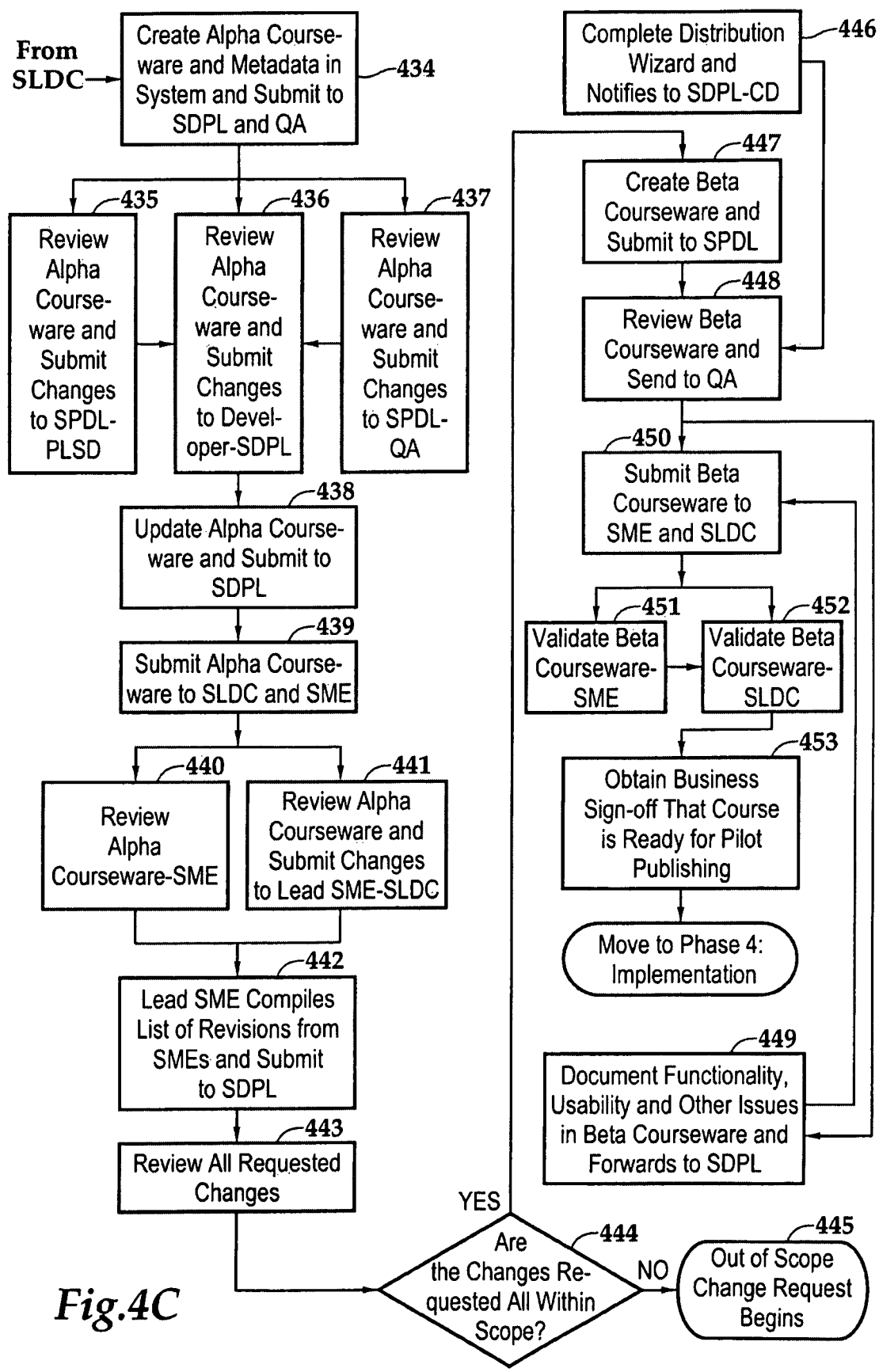

Referring now to FIGS. 4A to 4C, the development phase 400 for developing the components of a performance-learning solution is set forth based on the plan designed by the design phase 300. A development team meeting is held by the senior development projects leader (SDPL) (401), during which the components of the performance-learning solution are discussed (402). A decision is made whether to pursue an eLearning (electronic learning) solution (404) or a non-eLearning solution (403). If a non-eLearning solution is prescribed, instructor-led methods are pursued. If an eLearning solution is prescribed, this leads to the creation of a storyboard (407) with inputs and supporting documentation from the subject matter expert (SME) (405) and the performance-learning solutions designer (PLSD) (406). The created storyboard is sent to the senior development projects leader (SDPL) for review (408), who in turn receives input from quality assurance (QA) (409) and the performance-learning solutions designer (PLSD) (410). If any additional updates are required (411), the content developer (CD) updates the storyboard templates (412) and once again submits the storyboards to the senior development projects leader (SDPL) for review and receives input from performance learning solutions designer (PLSD) and quality assurance (QA). After the storyboard has been finalized by the senior development projects leader (SDPL), they are submitted for approval (413) to the subject matter expert (SME) and the senior learning and development consultant (SLDC). The subject matter expert (SME) provides comments (414) as does the senior learning and development consultant (SLDC) (415). The comments are consolidated by the lead subject matter expert (SME) (416), who submits the consolidated comments to the senior development projects leader (SDPL) (417). The senior development projects leader (SDPL) reviews all of the received comments and requested changes and determines if the changes are within the scope of the performance-learning solution to which the storyboards are directed (418). If the requests fall outside the scope of the performance-learning solution, they are not considered and a change request may be submitted. If the changes are not within the appropriate scope, an out of scope change request commences (419). If the changes are within the appropriate scope, they are incorporated into the storyboard (420). The content developer (CD) submits the updated storyboard to the senior development projects leader (SDPL) (421). The senior development projects leader (SDPL) reviews the storyboard templates and submits them to quality assurance (QA) (422). The quality assurance (QA) reviews the requested changes in the storyboards and submits the storyboards to the senior development projects leader (SDPL) (423). The SDPL also submits the storyboards to performance-learning solutions designer (PLSD), senior learning and development consultant (SLDC) and subject matter expert (SME) for review and sign-off (424). The lead subject matter expert (SME) (427), reviews the storyboards for sign-off, along with the senior learning and development consultant (SLDC) (426) and performance-learning solutions designer (PLSD) (425). The comments from the subject matter expert (SME), senior learning and development consultant (SLDC), performance-learning solutions designer (PLSD) and quality assurance (QA) are transmitted to the senior development projects leader (SDPL) for approval (428). After the senior development projects leader (SDPL) has approved the updated storyboards, they are submitted for legal and product review (429) and any changes made are transmitted back to the senior development projects leader (SDPL) (430). If senior development projects leader (SDPL) approval for the updated storyboards is not obtained, they are returned to step 411 to begin the approval process again.

The senior development projects leader (SDPL) reviews the changes to ensure that they are within the scope of the performance-learning solution and sends the proposed changes to the content developer (CD) (431). The content developer (CD) creates an update based on legal review and resubmits the storyboards to legal for an additional review (432). Legal approval is obtained for the updated storyboards (433), which are then forwarded to the content developer (CD), who creates performance-learning solution ware to accompany the eLearning solution (434). If legal approval is not obtained, the updated storyboards are transferred to step 430 to obtain the necessary legal approvals.

The performance-learning solutionware created by the content developer (CD) is submitted to the performance-learning solutions designer (PLSD) (435), senior development projects leader (SDPL) (436) and quality assurance (QA) (437) for reviews. Any proposed changes are incorporated by the content developer and the learning solutionware is updated and submitted to the senior development projects leader (SDPL) (438). The senior development projects leader (SDPL) in turn submits the updated learning solutionware to senior learning and development consultant (SLDC) and subject matter expert (SME) for review (439). The lead subject matter expert (SME) compiles the list of revisions received from the subject matter expert (SME) (441) and senior learning and development consultant (SLDC) (440) and submits them to the senior development projects leader (SDPL) (442). The senior development projects leader (SDPL) reviews all of the requested changes (443) and determines if the requested changes are within the scope of the performance-learning solution (444). If the changes are not found to be within the scope of the performance-learning solution, a change request is submitted (445). The content developer (CD) completes a distribution wizard that determines the recipients of the performance-learning solution ware (446) and notifies the senior development projects leader (SDPL) (449).

If the changes are found to be within the scope of the performance-learning solution, the content developer (CD) creates revised learning solution ware and submits the revised learning solution ware to senior development projects leader (SDPL) for review (447). The senior development projects leader (SDPL) submits the reviewed learning solution ware to quality assurance (QA) (448), who reviews the content for document functionality, usability and other issues with the revised learning solution ware (449). Following its review, the quality assurance (QA) submits the revised learning solution ware to senior development projects leader (SDPL), who in turn submits the courseware to the subject matter expert (SME) and senior learning and development consultant (SLDC) (450). The subject matter expert (SME) (451) and senior learning and development consultant (SLDC) (452) validate the revised learning solution ware, and the senior learning and development consultant (SLDC) obtains sign-off from the business sponsor to proceed with the pilot publishing of the performance-learning solution (453).

As will be readily appreciated by one of ordinary skill in the art, it will not always be the best approach for the performance-learning solution 100 to internally develop deliverable learning content in response to a learning effort requested by the organization. Often, time constraints, subject matter constraints, and other logistical issues may make it more cost effective for the performance-learning solution to purchase or license previously developed learning content (completely ready for delivery to learners or otherwise) or commission the development of suitable learning content from third-party developers. For example, if the organization needed employee training for a new computer system, it may be more efficient to purchase training or reuse training materials from the provider of the new computer system as opposed to creating new learning content internally from scratch. Therefore, the design flow 120 according to embodiments of the invention also contains processes that enable the procurement of third-party learning content and services as well as integrating that content and services for delivery and administration within the control of the learning solution.

As was the case with internally developed learning content, any learning content purchased or licensed from third-party providers would need to meet the detailed budget allocation information, delivery, timelines, and initial content design requirements established by the analysis module. Also similar to how was described above with respect to the content development phase 400, any content obtained from third-party sources would be certified, formatted, versioned, tagged and cataloged in roughly the same manner as internally developed learning assets. After receiving third-party content, the development flow 130 still, like in development phase 400, certifies the content against requirements established by the business alignment module. Any eLearning content would then be versioned and/or formatted to be compatible or consistent with internally developed content. Such eLearning assets would then be tagged appropriately and placed into data stores to facilitate organization, delivery upon demand, and location/reuse of the content for the current and future learning efforts. In this manner, development flow 120 allows the performance-learning solution 100 to take advantage of the most efficient mechanisms for assembling appropriate learning content for efforts needed by the organization.

Figure 5A:
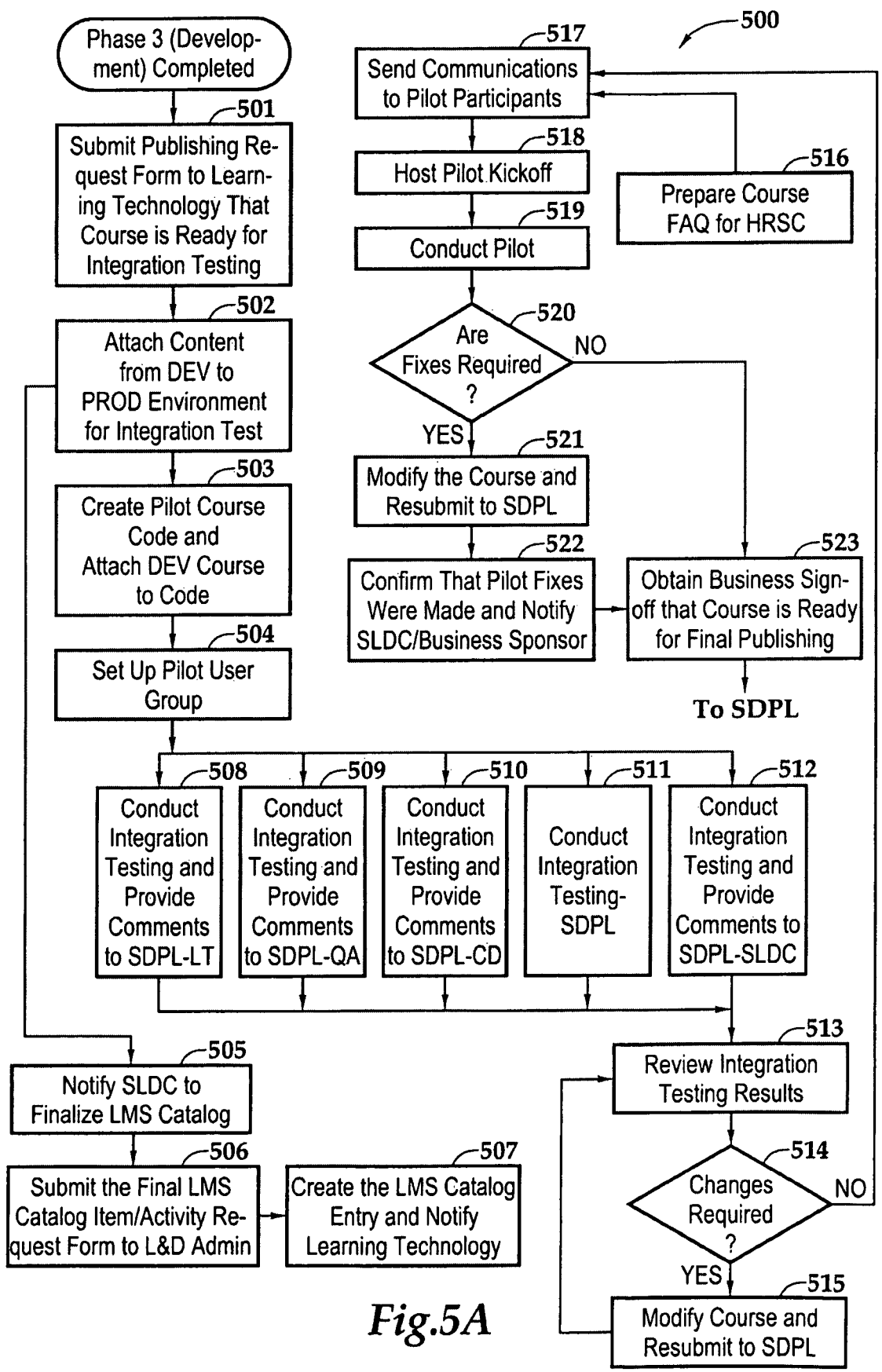
FIGS. 5A and 5B show a flow diagram depicting the implementation step according to embodiments of the present invention; and, FIG. 6 is a flow diagram the evaluation step according to embodiments of the present invention.
Figure 5B:
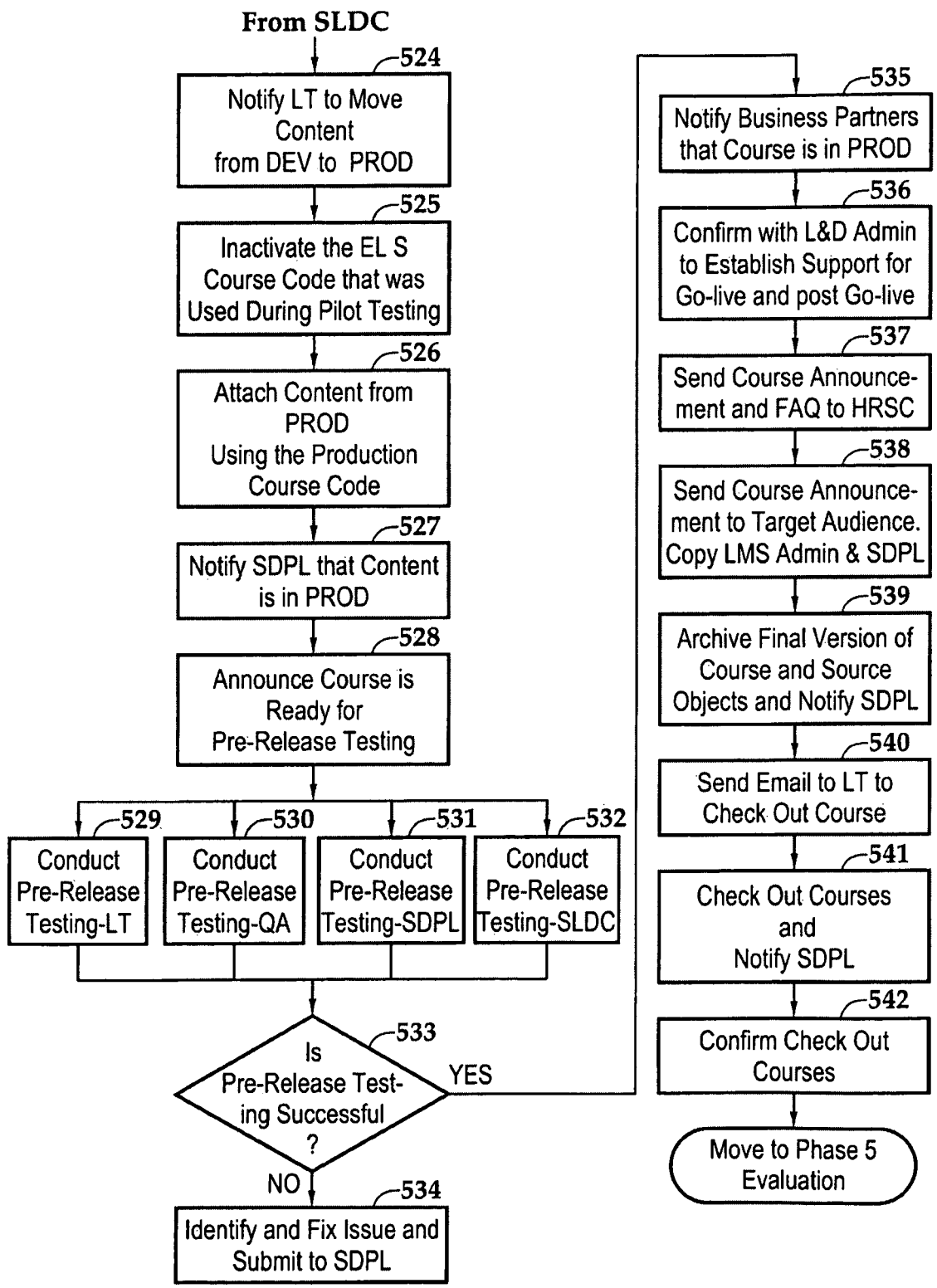

As indicated above with respect to the discussion of FIG. 1, the mechanisms and media through which the implementation flow 140 provides, the performance-learning solution to learners of the organization is adapted to service the overall business strategies and specific learning efforts needs of the organization by organizing delivery to learners in the most resource efficient and cost efficient manner; Suitable mechanisms and media by which learning content may be delivered to learners according to embodiments of the present invention can include combinations of eLearning solutions available over electronic networks (such as the Internet) for self-paced instruction, interactive virtual classroom instruction and related media (both video and animation) available over electronic networks which utilize instructors to lead classrooms of remotely located learners, in person training, and paper-based products used in conjunction with by self-paced or instructor training Turning now to FIGS. 5A to 5C, there is depicted the implementation phase 500 of a performance-learning solution 100 according to embodiments of the present invention. After the development phase 400 has been completed and senior learning and development consultant (SLDC) has obtained a sign-off from the business sponsor that the performance-learning solution is ready for pilot publishing, the publishing request form is submitted by senior development projects leader (SDPL) to learning technology (LT) that the performance-learning solution is ready for integration testing (501). Learning Technology (LT) incorporates content generated during the development phase to an, existing learning management system (LMS) template (502). Learning Technology (LT) creates a pilot learning course code (503) and sets up a pilot user group (504). The senior development projects leader (SDPL) also notifies senior learning and development consultant (SLDC) to finalize the learning management system (LMS) catalog (505). The senior learning and development consultant (SLDC) submits the final LMS catalog item request form to a Learning and Development (L&D) administrator (506). The Learning and Development (L&D) administrator creates the learning management system (LMS) catalog entry and notifies Learning Technology (LT) (507).

Each of the Learning Technology (LT) (508), quality assurance (QA) (509), content developer(CD) (510), senior development projects leader (SDPL) (511) and senior learning and development consultant (SLDC) (512) conduct integration testing and provide comments. The senior development projects leader (SDPL) reviews and incorporates the integration testing results (513) and determines if changes are required (514). If changes are required, the performance-learning solution is modified, as necessary and resubmitted to senior development projects leader (SDPL) for review (515). If no changes are required to the performance-learning solution, it is transmitted to pilot participants (517). At the same time, the senior development projects leader (SDPL) prepares frequently-asked questions (FAQs) to be submitted to the Human Resources Service Center (HRSC) (516).

The senior learning and development consultant (SLDC) hosts a pilot kick-off (518) and conducts the pilot program that is attended by pilot participants (519). After the pilot has been conducted, the senior development projects leader (SDPL) determines if any fixes or adjustments are required to be made to the performance-learning solution (520). If any adjustments are required to be made, the performance-learning solution is appropriately modified and resubmitted to the senior development projects leader (SDPL) (521). The senior development projects leader (SDPL) confirms that the adjustment and fixes have been incorporated and notifies the senior learning and development consultant (SLDC) and the business sponsor (522). The senior learning and development consultant (SLDC) obtains the sign-off from the business sponsor that the performance-learning solution is ready for final publishing (523). The senior development projects leader (SDPL) notifies Learning Technology (LT) that the performance-learning solution is ready to be moved into production (524). Learning Technology (LT) undertakes the necessary steps to move the performance-learning solution into production (525-526). Learning Technology (LT) then notifies senior development projects leader (SDPL) that the performance-learning solution content is in production (527). The senior development projects leader (SDPL) announces that the performance-learning solution is ready for pre-release testing (528). The pre-release testing is conducted by Learning Technology (LT) (529), Quality Assurance (QA) (530), senior development projects leader (SDPL) (531) and the senior learning and development consultant (SLDC) (532). The senior development projects leader (SDPL) determines if the pre-release testing is successful (533). If the testing is not successful, the issues are identified and fixed and submitted to the senior development projects leader (SDPL) for approval (534). If the testing is successful, the senior learning and development consultant (SLDC) notifies the business sponsor that the performance-learning solution is in production (535) and confirms with the Learning and Development (L&D) administrator to establish support for go-live and post go-live phases of the implementation process (536). The Learning and Development (L&D) administrator sends the learning solution announcements and frequently-asked questions (FAQs) to Human Resources Service Center (HRSC) (537). The senior learning and development consultant (SLDC) sends the performance-learning solution announcement to the target audience (538). The content developer archives the final version of the performance-learning solution for current and future use (539). The content developer (CD) sends a notification to Learning Technology (LT) that the courses are ready to be checked-out (540). Learning Technology (LT) checks out the courses and notifies senior development projects leader (SDPL)(541). The senior development projects leader (SDPL) confirms that the courses have been checked out by the learners (542).

Referring back to FIG. 1, embodiments of the performance-learning solution 100 according to the present invention require administrative function support which is provided by the evaluation flow 150. The evaluation flow 150 coordinates the process that respond to various administrative factor inputs as necessary to successfully operate and manage a global learning system. The administrative processes according to the present invention allow, inter alia, learners to enroll for learning solutions, instructors to finalize "grades" or other indicia of performance-learning solution passage, and learning administrators to request and reserve resources for specific classes. While similar administrative functions are present in various common learning environments, such as in traditional colleges and universities, the processes employed in these traditional environments to perform these functions are not capable of integrating these functions into a performance-learning solution that enables alignment with business strategies by, among other things, generating performance metrics.

Specific learning administrative functions that may be provided by the evaluation flow 150 in embodiments of the present invention include, but are not limited to, enrolling learners in learning solutions, wait listing learners enrolled for learning solutions that are closed, providing documentation to training coordinators, creating new user profiles, confirming enrollment in a specific learning solution, adding a performance-learning solution session to the learning system and notifying the instructor by e-mail, developing, approving and entering the learning solutions into the learning system, adding and reserving resources, sending learners pre-training materials, adding and modifying training locations, canceling instructor sessions and unbooking allocated resources, deleting scheduled meetings, distributing notices of changes by sending e-mails to interested parties, updating learner transcripts and attendance information, administering on-line performance-learning solution and instructor evaluations, mailing performance-learning solution completion materials to learners, and sending performance-learning solution completion or passage/certification records to human resources for employee files.

The performance-learning solutions compile, track, report and utilize performance metrics to assist in ensuring that learning efforts provided by the solution coincide with business goals and priorities in all aspects of learning including the identification and prioritization of learning needs, the selection of learning approaches, and the development of learning content, and the coordination and delivery of learning instruction. The performance metrics use the same objective indicia used by the organization to gauge success. Performance metrics can be collected, tracked compiled, and reported automatically by information gathering and sorting tools.

In some embodiments of the present invention the performance-learning solution is provided by an independent business entity according to a service level agreement with an organization in need of learning services outsourcing. A service level agreement is a contract between the performance-learning solution services provider and the licensing (i.e., outsourcing) organization that establishes the requisite quality and effectiveness levels of the performance-learning solution services as measured by one or more pre-selected performance metrics.

Figure 6:
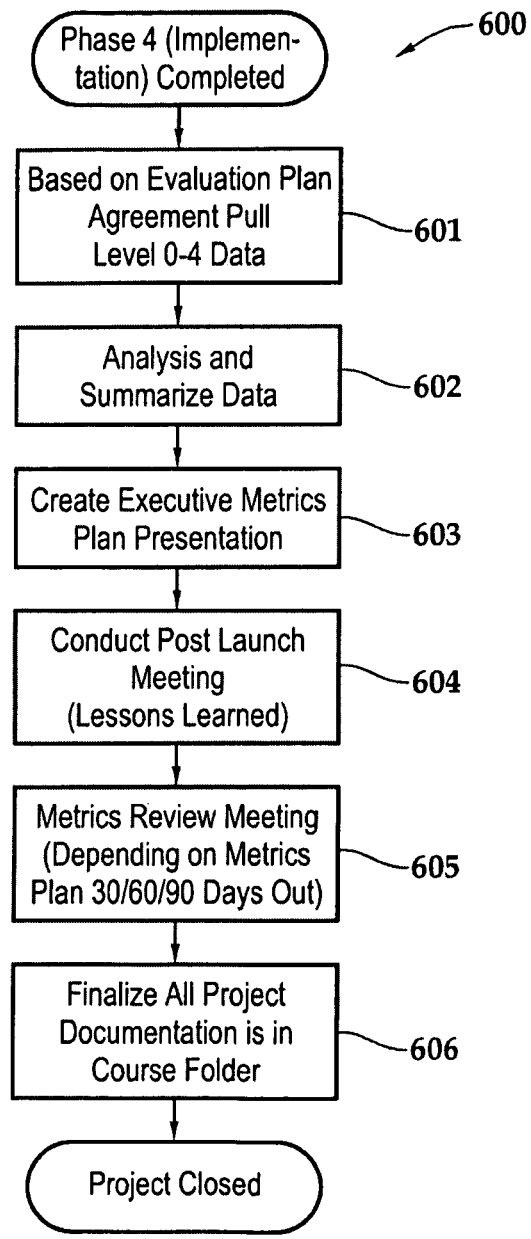

Referring now to FIG. 6, a process for the evaluation of the impact of the performance-learning solution on the target audience is provided (600). Level 0-4 data is collected to determine the effect of the performance-learning solution (601). The data is analyzed and summarized (602). An executive metrics plan is created and presented (603). A post-launch meeting is conducted (604) at which the lessons learned from the implementation of the performance-learning solution are discussed. After a suitable interval following the post-launch meeting, i.e., 30, 60 or 90 days out, a metrics review meeting is held (605) to address concerns relating to the communication plan, performance-learning solution assessment and performance-related concerns. Following the metrics meeting, the project documentation is collected and finalized and placed in a performance-learning solution folder (606).

During the evaluation process, the success of the instruction is analyzed through several levels of data. One type of data, referred to herein as Level 0 data, refers to the number of learners who participated in the instruction. While serving as a very basic measure of the effectiveness of training, learner numbers reflect the fact that the training is addressing a need and that the design and methodology is meeting expectations. The level 0 data should be reviewed to gauge attendance trends based on initial expectations. If the attendance expectations are not being met, the instructional plan and instructional aspects of the training need to be readdressed and revised as appropriate.

Level 1 data refer to the target audience members' reactions. Learners' reactions are important because, if learners react negatively to the instruction, they are less likely to transfer the instruction to their work and more likely to give bad reports to their peers, leading in turn to lower numbers at future instructional presentations. The level 1 data should be reviewed for trends and general views based upon which, aspects of the training should be revised as needed to increase satisfaction.

Level 2 data measures learning in terms of new and improved skills, knowledge and attitudes. Learning can be measured objectively using a test or exam or an assessed exercise. If a learner has to achieve a certain level of learning to obtain a passing grade, then the number of passes may be used as an evaluation measure. A further aspect of learning measured with level 2 data includes the degree of retention of the instruction by members of the audience. The level 2 data should be reviewed to determine if the majority of the learners attained the desired level of mastery. Additionally, the performance-learning solution should be reviewed to see if there are aspects that could be revised to facilitate the learning process.

Level 3 data measures the changes to the learner's behavior based upon the instruction received. In other words, if a learner employs what they have learned appropriately, their work behavior will meet the desired criteria. Behavior can be measured through observation or through automated means such as testing. In order to assess the amount of behavioral change, measurements are required to be taken before and after the training. The level 3 data should be reviewed to determine if the instruction has had a positive effect on the learner's job performance. If the outcome of the review is unsatisfactory, a review should be performed to determine if there are any obstacles in the way of the learner's on-the-job application of the performance-learning solution subject matter. Additionally, a review should be conducted to determine if the relevant post-training support processes have been made available to the learners.

Level 4 data measures the impact of training on business results. A wide variety of indicators can be employed to measure the impact of training on performance including numbers of complaints regarding job performance, sales made and output per hour. In order to effectively assess the impact of training on performance, the learners should be compared to a group of subjects who have not participated in the training. The level 4 data should be reviewed to determine how the training has impacted the achievement of strategic business goals.

Based on the results of the data collection a determination may be made as to what, if anything, needs to be altered in the instructional learning solution, and create a cost-effective plan for making the changes. Additionally, a determination may be made as to whether any additional follow-on training is required that would build on the skills and knowledge provided by the learning solution, in support of the learning objectives.

Additionally; a gaps analysis process may be employed to quantify the gap, if any, that exists between a learner's current job performance and the desired level. The gaps analysis process looks at the current state of the associate's job performance and looks at what is actually taking place vis-à-vis the current performance of the organization and its individuals. The gap analysis process also determines the desired business results, and translates the desired results into steps that must be undertaken to close or lessen the gap.

The gaps may be defined in terms of magnitude, i.e., greatness in size, extent, significance and/or influence; their value, monetary or material worth in terms of reduced sales or orders; and urgency, i.e., is the gap of pressing importance and necessity and does it require speedy action.

In defining a performance gap, it is useful to find the cause of the gap through cause analysis. Cause analysis identifies the reasons contributing to the gap. Identifying the reasons behind the performance gap helps determine opportunities for improvement and identify solutions to the performance need.

Embodiments of the invention provide performance-learning solutions that are tailored to the needs of leaders and learners. These solutions termed "adaptive learning systems" assume a decentralized paradigm of instruction where educational resources and services are made available beyond the boundaries of any single institution or discipline. Experience proves that the best way to avoid a mismatch between supply and demand is to deploy technology in response to clearly articulated needs. In an adaptive learning system, a learning experience is pulled by demand rather than driven by pre-determined need.

The term adaptive also relates to the flexibility and scalability of the envisioned learning system. The content and courseware are modular and reusable, interoperable and easily organized at many different levels of complexity throughout an on-line instructional environment. Tools for developing instructional content and courseware operate across different platforms and communicate with other tools used to build and manage learning systems. The systems themselves accommodate numerous and varied learner requirements, needs and objectives. The needs of instructors and instructing organizations are also addressed in adaptive learning systems.

Business goals for adaptive learning systems include making high-quality instructional content more efficient, adapting the instruction to the end-user requirements of both learners and learning professionals, and to make high-quality instructional content more available.

Adaptive learning systems as provided by the present invention permit the assessment of a user's existing knowledge of a particular subject matter. Therefore, these systems allow a performance-learning solution to be tailored to the user, so that the user is not provided with subject matter that he/she already knows, but rather is provided course content that is new to the user and in line with the user's educational needs.

Embodiments of the invention provide the ability to reuse course content by virtue of the implementation of the learning content management system (LCMS). Reusability of the content provides improvements in increased quality and consistency, and long-term reduced time and costs for development and maintenance. In addition, reuse provides the ability to rapidly reconfigure content to meet changing needs, facilitates content inventory and makes it easier to assess content needs. The learning content management system of the present invention makes reusing content attractive and less time-consuming to the administrator and user.

Embodiments of the present invention are directed to a method of creating a performance-learning solution comprising the steps of evaluating the existing subject matter content, reusing those existing packets of the subject matter that may be reused in the performance-learning solution, creating new components of subject matter that may be incorporated into the performance-learning solution and using a subject matter expert to integrate the existing subject matter with the newly created subject matter to produce a performance-learning solution.

Embodiments of the invention are also directed to a method for aligning employee learning efforts with strategic business goals and priorities of an employer organization, where the method comprises, receiving a set of business goals from the employer organization; identifying performance data collected by the employer organization; transforming the business goals of the employer organization into performance metrics relative to the performance data; designating business goals for prioritizing learning efforts of the employer organization, the business goals correlating to the performance metrics; receiving requests from the employer organization for learning efforts to train the employees and sorting the requests into priorities; selecting appropriate performance-learning solution approaches for each received request, the appropriate performance-learning solution approaches being subject to a budget allocation for the each learning effort request; monitoring the performance data subsequent to delivery of the performance-learning solution and computing changes in the performance data caused by delivery of the performance-learning solution; and reporting measurement of the performance metrics based on the computed changes in the performance data. The business goals and the collected performance data may be analyzed to determine the feasibility of using the collected performance data to measure achievement of the set of business goals.

The step of transforming the business goals of the employer organization into performance objectives and metrics relative to the performance data comprises identifying performance gaps, where the performance gap is the difference between a current value of performance data and a desired value of performance data. The step of transforming the business goals of the employer organization into performance objectives and metrics relative to the performance data comprises identifying sources of data needed to measure the performance metrics, the sources of data being provided by the employer organization. An additional step also involves determining an appropriate data collection method for the identified sources of data.

In certain embodiments of the invention, an evaluation mechanism is used to evaluate the effect of the learning effort on the performance data. The evaluation mechanism used is a control group, use of historical data to create a baseline, or the use of estimated data to create a baseline. A step in the evaluation phase also involves the step of reporting measurement of the performance metrics which in turn involves converting the computed changes in the performance data to monetary values. Based on the results of the evaluation phase, remedial actions may be recommended based on the reported measurement of performance metrics.

The concepts of the invention may be implemented as a method and in hardware or software. The software may be embodied in various types of computer readable media. Those skilled in the art will recognize improvements and modifications to the preferred embodiments of the present invention. All such improvements and modifications are considered within the scope of the concepts disclosed herein and the claims that follow.

What is claimed is:

1. A system for training a trainee on a learning solution, the system comprising:
a server providing remote access to a website over a network, wherein the website is accessible by a trainee to facilitate real time interaction between the trainee and a learning solution, and is configured for display by an output device, the server including:
a non-transitory storage medium; and
a processor in communication with the non-transitory storage medium, the processor configured to:
receive instructional materials associated with at least one respective learning object;
assemble the instructional materials into a plurality of learning modules;
store the plurality of learning modules in the non-transitory storage medium;
administer a pre-instruction assessment on the website;
determine a pre-existing knowledge assessment score of the trainee based on responses to the pre-instruction assessment;
determine the pre-existing knowledge assessment score fails to meet an expected competency threshold score for at least a portion of the instructional materials;
identifying a first subset of learning modules from the plurality of learning modules based on the pre-existing knowledge assessment score, the first subset of learning modules being associated with the expected competency threshold score for the at least the portion of the instructional materials;
deliver the first subset of learning modules of the plurality of learning modules to the trainee via on the website according to a first sequence based on the learning solution;
administer a first post-instruction assessment of the instructional materials on the website after the trainee completes the first subset of learning modules;
receive a first post-instruction assessment response that indicates a first post-instruction knowledge assessment score;
determine the first post-instruction knowledge assessment score fails to meet the expected competency threshold score;
generate a second sequence that is different from the first sequence based on the first post-instruction knowledge assessment score failing to meet the expected competency threshold score;
re-deliver the first subset of learning modules to the trainee via the website according to the second sequence, based on the first post-instruction knowledge assessment score failing to meet the expected competency threshold score;
administer a second post-instruction assessment of the instructional materials on the website after the trainee re-completes the first subset of learning modules;
receive a second post-instruction assessment response that indicates a second post-instruction knowledge assessment score;
determine the second post knowledge assessment score fails to meet the expected competency threshold score;
determine a first difference value between the expected competency threshold score and the first post-instruction knowledge assessment score;
determine a second difference value between the expected competency threshold score and the second post-instruction knowledge assessment score;
determine the second difference value indicates little or no knowledge assessment score improvement based on the first difference value being equal to or lower than the second difference value;
provide a notification to an administrator that indicates the little or no knowledge assessment score improvement;
determine a second subset of learning modules from the plurality of learning modules, wherein the second subset of learning modules is associated with minimum improvement goals of the learning solution, and wherein the second subset of learning modules has fewer learning modules than the first subset; and
deliver the second subset of learning modules to the trainee via the website according to the second sequence based on the little or no knowledge assessment score improvement.

2. A server comprising:
a processor; and
a non-transitory storage medium in communication with the processor and storing computer-executable instructions that, when executed by the processor, cause the processor to:
provide remote access to a website over a network, wherein the website is accessible by a trainee to facilitate real time interaction between the trainee and a learning solution and is configured for display by an output device;
receive instructional materials associated with at least one respective learning object;
assemble the instructional materials into a plurality of learning modules;
store the plurality of learning modules in the non-transitory storage medium;
administer a pre-instruction assessment on the website;
determine a pre-existing knowledge assessment score based on responses to the pre-instruction assessment;
determine the pre-existing knowledge assessment score fails to meet an expected competency threshold score for at least a portion of the instructional materials;
identifying a first subset of learning modules from the plurality of learning modules based on the pre-existing knowledge assessment score, the first subset of learning modules being associated with the expected competency threshold score for the at least the portion of the instructional materials;
deliver the first subset of learning modules of the plurality of learning modules to the trainee via the website according to a first sequence based on the learning solution;
administer a first post-instruction assessment of the instructional materials on the website after the trainee completes the first subset of learning modules;
receive a first post-instruction assessment response that indicates a first post-instruction knowledge assessment score;
determine the first post-instruction knowledge assessment score fails to meet the expected competency threshold score;
generate a second sequence that is different from the first sequence based on the first post-instruction knowledge assessment score failing to meet the expected competency threshold score;
re-deliver the first subset of learning modules to the trainee via the website according to the second sequence, based on the first post-instruction knowledge assessment score failing to meet the expected competency threshold score;
administer a second post-instruction assessment of the instructional materials on the website after the trainee re-completes the first subset of learning modules according to the order of the second sequence;
receive a second post-instruction assessment response that indicates a second post-instruction knowledge assessment score;
determine the second post-instruction knowledge assessment score fails to meet the expected competency threshold score;
determine a first difference value between the expected competency threshold score and the first post-instruction knowledge assessment score;
determine a second difference value between the expected competency assessment score and the second post-instruction knowledge assessment score;
determine the second difference value indicates little or no knowledge assessment score improvement based on the first difference value being equal to or lower than the second difference value;
provide a notification to an administrator that indicates the little or no knowledge assessment score improvement;
determine a second subset of learning modules associated with minimum improvement goals of the learning solution, wherein the second subset of learning module has fewer learning modules than the first subset; and
deliver the second subset of learning modules to the trainee via the website according to the second sequence based on the little or no knowledge assessment score improvement.

3. The server of claim 2, wherein the computer-executable instructions further cause the processor to:
receive a statement of work (SOW) that is addressable by the learning solution; and
generate a request for the instructional materials in response to receiving the SOW.

4. The server of claim 2, wherein the computer-executable instructions further cause the processor to:
collect attendance data associated with the learning solution for multiple trainees;
determine that the attendance data indicates lower attendance than an attendance expectation associated with the learning solution; and
revise the plurality of learning modules in response to determining that the attendance data indicates lower attendance than the attendance expectation.

* * * * *